United States Patent [19]

Lichty et al.

[11] 4,195,915

[45] Apr. 1, 1980

[54] LIQUID CRYSTAL IMAGE PROJECTOR SYSTEM

[75] Inventors: William R. Lichty, Culver City; John J. Ferrer, Los Angeles; Lacy G. Cook, Hawthorne; Michael N. Ernstoff, Los Angeles, all of Calif.

[73] Assignee: Hughes Aircraft Company, Culver City, Calif.

[21] Appl. No.: 903,348

[22] Filed: May 5, 1978

[51] Int. Cl.$^2$ ................................. G02F 1/13
[52] U.S. Cl. ................................. 350/345; 350/334; 350/338; 350/339
[58] Field of Search ............... 350/345, 338, 342, 339, 350/334

[56] References Cited

U.S. PATENT DOCUMENTS 4,124,279  11/1978  Byles ................................. 350/345

Primary Examiner—Edward S. Bauer
Attorney, Agent, or Firm—G. L. Cline; D. C. Keaveney; W. H. MacAllister

[57] ABSTRACT

There is disclosed a liquid crystal image projector which is suitable for use as an image source in an aircraft head-up display system. In this application, the projector provides extremely bright and high contrast symbology for the aircraft pilot. More generally, the projector has application wherever a television-type raster and/or calligraphic symbology display is needed. The increase in brightness and contrast ratio is achieved by using a reflector to concentrate light from a light source onto the liquid crystal display cell from whence it is reflected through an optical aperture stop in the reflector to the projecting lens and thence to a viewing surface.

9 Claims, 2 Drawing Figures

LIQUID CRYSTAL IMAGE PROJECTOR SYSTEM

The government has rights in this invention pursuant to Contract No. F33615-76-C-1243 awarded by the Department of the Air Force.

BACKGROUND OF THE INVENTION

Liquid crystal display devices have been described in such patents as U.S. Pat. No. 3,824,002 issued to T. D. Beard on July 16, 1974; U.S. Pat. No. 3,844,879 issued to T. D. Beard and W. P. Bleha on July 10, 1973; U.S. Pat. No. 3,885,095 issued to G. Wolfson and E. R. Fehr et al on May 20, 1975; U.S. Pat. No. 3,824,003 issued to N. J. Koda et al on July 16, 1974; U.S. Pat. No. 3,862,360 issued to H. G. Dill et al on Jan. 21, 1975; U.S. Pat. No. 3,915,548 issued to E. W. Opittek et al on Oct. 28, 1975; U.S. Pat. No. 3,976,361 issued to L. M. Fraas et al on Aug. 24, 1976, and U.S. Pat. No. 4,019,807 issued to D. Boswell et al on Apr. 26, 1977.

The foregoing patents serve to illustrate the state of the art in liquid crystal display systems. Some of them, such as the Beard or the Dill patent, disclose liquid crystal display elements of a type which may be used as a component in the system of the present invention. Others of them such as the Opittek patent and the Wolfson patent disclose alternative prior art head-up display systems using a different optical system than that of the present invention and which do not have the brightness or contrast ratio which can be achieved with the present invention.

It is therefore an object of the present invention to provide a liquid crystal image projector system which affords very high brightness and high contrast ratio in a system suitable for use in an aircraft cockpit.

SUMMARY OF THE INVENTION

The projector system consists of an efficient lamp which is used as an external illumination source for the liquid crystal cell or display means, a filter in front of the lamp to reduce the ultraviolet and infrared radiation that is radiated into the sealed projector optical system, an aspheric reflector to gather and consentrate the lamp light output onto the liquid crystal display surface, the liquid crystal display panel for creation of the image to be projected, and a stop comprising an optical aperture in the reflector through which light reflected from the liquid crystal display element is transmitted to a projection lens which focuses the liquid crystal image onto an image viewing screen. A wedge-shaped glass or other transparent member may be positioned on or may comprise the front surface of the display cell so that the reflections from this first surface will be reflected away from the stop aperture and only those from the second surface or reflective electrode of the liquid crystal display panel will be transmitted through the aperture.

BRIEF DESCRIPTION OF THE DRAWING

These and other objects, features and advantages of the invention will be more fully apparent to those skilled in the art from the detailed description of the invention below taken in conjuction with the accompanying drawings in which like reference characters refer to like parts throughout and wherein.

DETAILED DESCRIPTION OF THE INVENTION

Figure 1:
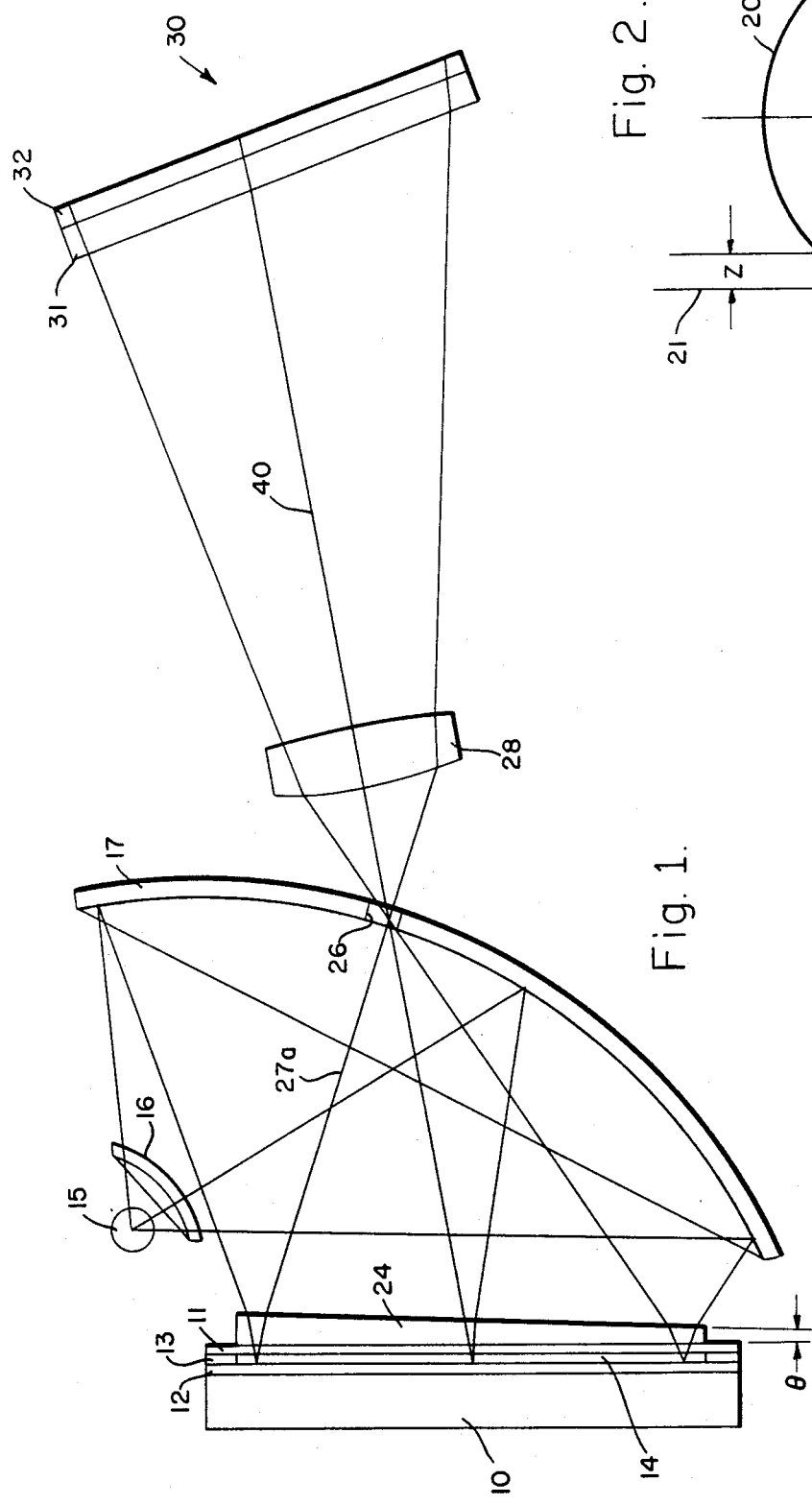
FIG. 1 is an optical schematic cross-sectional view of the liquid crystal image projector system of the present invention.

There is shown in FIG. 1 an optical schematic view of the projector system. This system comprises a substrate or back plate 10 upon which is mounted a liquid crystal display cell including a transparent front plate 11 and a reflective rear plate 12 separated by spacer members 13 to provide a central cavity 14 which confines the liquid crystal material of the cell. The liquid crystal cell is mounted for support on substrate 10 and may be provided with optical or electrical input signals via substrate 10 in any manner which is well known in the prior art cited above. The inner surface of the front glass or otherwise transparent plate 11 has on it a transparent electrode which may, for example, be formed by a film of indium tin oxide. The rear plate member 12 preferably includes a matrix array of reflective electrodes which may be individually activated when the device is driven by digital electronic signals as in the Koda or Dill patents cited above. If the device is to be driven by a photo-image input as from a cathode ray tube, (as in the Beard patent cited above) then the rear reflected electrode 12 includes in its sandwich composition a photoconductive diode of the type shown in the Fraas patent cited above. In any of these drive arrangements, however, the liquid crystal is operated in the dynamic scattering mode.

The liquid crystal display is then used in a specular mode, that is, the bright parts of the image are created by the light reflected from the "off" mode pixels or elements of the matrix array. The dark parts of the image are created by pixels the electrodes for which are energized so that the liquid crystal is in the scattering mode. That is to say, the liquid crystal material is selected for operation in what is commonly referred to in the prior art as the dynamic scattering mode (as distinguished from birefringent modes) in which the liquid crystal material at a point at which an electric field is applied across it in excess of a threshold value becomes turbulant and causes scattering of light supplied from the front of the cell for transmission through the liquid crystal material which in the off or unenergized condition is otherwise clear and transparent.

This input light is supplied from a light source 15. In a preferred exemplary embodiment this light source was a thallium iodide arc lamp which was chosen because this lamp is capable of producing a narrow spectral wave-band of light with high efficiency. It will be understood that in general applications any type of lamp or illumination source can be used.

An infrared-ultraviolet filter 16 is positioned in front of lamp 15. Liquid crystal material can be affected deleteriously when subjected to high intensity ultraviolet light and therefor the filter is required to protect it. Furthermore, minimizing the amount of infrared radiation or heat that is radiated into the sealed optical system is also necessary. In the preferred exemplary embodiment a Schott GG475UV filter formed into a spherical section with an OCLI hot mirror coating was used to meet these requirements. In general, any standard infrared or ultraviolet filter can be used.

Figure 2:
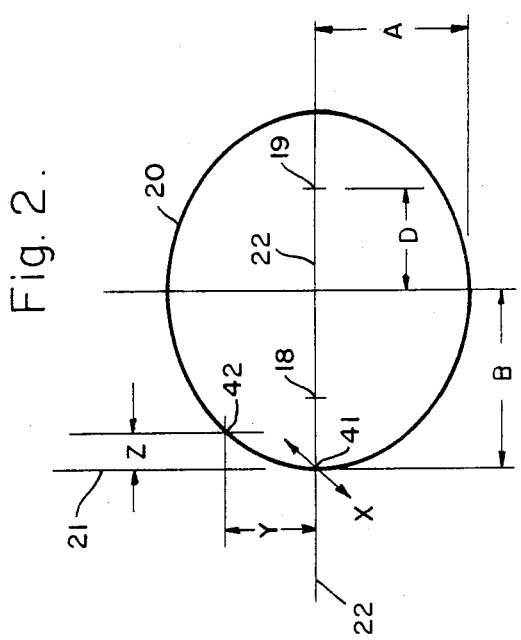
FIG. 2 is a diagrammatic view illustrating the geometric parameters of the ellipse upon which the design of the aspheric reflector is based.

Light from the light source 15 is transmitted through filter 16 to an aspheric reflector 17. This reflector may, for example, be a complex rotationally symmetric aspheric. When such a symmetric shape is used for ease of manufacturing, it is symmetric about the line joining the two foci 18 and 19 of the ellipse 20 shown in FIG. 2. The lamp or light source 15 is positioned at foci 18. The aspheric curvature can be approximated by sag departures (Z) from the tangent plane 21 of an ellipsoid formed by rotating the ellipse 20 about its major axis 22 which, in FIG. 2, coincides with the Z axis in a Cartesian set of 3 orthogonal axes having their common origin or intersection at point 41. The Z axis lying along line 22 is horizontal in the plane of the paper in FIG. 2. The Y axis is defined by the intersection of the plane of the paper with tangent plane 21 which also intersects the Z axis at origin point 41. The X axis passes through origin 41 and is perpendicular to both the Y and Z axes.

The deviation of the major axis 22 of the ellipse from the Z axis measured along the X axis is zero. That is, as noted above, major axis 22 coinsides with the Z axis and the ellipsoid is formed by using this as the axis of revolution. For a point such as point 42 on ellipse 20 parameters discussed in detail below are measured by the deviation Z of point 42 from plane 21 measured along a parallel to the direction of the Z axis and by its deviation Y measured along a parallel to the Y axis. As noted, the deviation measured along a direction parallel to the X axis in zero for any point on the ellipse 20. The basic ellipse parameters and equations are set forth below with reference to the parameters identified in FIG. 2.

$$K = (A^2 - B^2)/B^2$$

$$C = 1/B(K+1)$$

$$A^2 = B^2 - D^2$$

The liquid crystal matrix display is covered by a wedge-shaped cover glass 24. Of course, it will be understood that the wedge shape member 24 can itself be the front panel 11. The angle $\theta$ of the wedge is selected to ensure that first surface reflections do not run through the aperture 26 of reflector 17. Reference is of course made to the reflections from the surfaces of the first transparent glass cover plate 11 of the liquid crystal cell. It will be recalled that the desired image is formed by reflection from the back or second surface electrode 12 of that cell. The shape of reflector 17 is designed to compensate for the distortion introduced into the desired image by the wedge-shaped cover glass 24.

In the particular preferred exemplary embodiment being described herein, the reflector shape parameters, Z and Y, for the reflector are as follows:

$$Z = \frac{CP^2}{1 + \sqrt{1 - (K+1)C^2P^2}} + dP^4 + eP^6 + fP^8 + gP^{10}$$

where: $P^2 = X^2 + Y^2$

For the exemplary system application the reflector coefficients were as follows:

$X = 0$
$C = 0.268190$
$K = -0.2089665$
$d = -0.92134 \times 10^{-4}$
$e = 0.75362 \times 10^{-4}$
$f = -0.75273 \times 10^{-5}$
$g = -0.23999 \times 10^{-6}$ The projector image plane at the front surface of liquid crystal cell member 12 consists of a liquid crystal display surface containing (in the exemplary embodiment) a matrix of pixels or elements. Such a display cell may, for example, conveniently be of the type shown in the above referenced U.S. Pat. No. 3,824,003 to Koda et al or U.S. Pat. No. 3,862,360 to Dill et al. The size of the liquid crystal active area and the number of pixels or pixel density is chosen to meet the space constraints and image resolution requirements of the system in which it is used. The projector system is designed to magnify or demagnify the liquid crystal image through the projection lens or lenses 28 in order to obtain the desired image size at the viewing screen 30. While the projection lens 28 shown herein is selected to accommodate a flat viewing screen 30, it will be understood that the projection lens may be chosen to produce an image on a concave or convex viewing screen if so desired.

The desired direction of the optic axis 40 with respect to reflection electrode 12 determines its intersection point with reflector 17 and thus locates aperture 26. In the preferred embodiment, this direction angle was 10.5° off of normal. It was established to meet the external optical system requirements. If this angle is changed, for example, to be normal to the reflection surface, all optical parameters change but the same general form of ellipse equation applies. Computerized ray tracing techniques are preferably used to reestablish the optical parameters of the system.

As noted above, the liquid crystal display is used in a specular mode, that is, the bright parts of the image are created by the light reflected from the "off" mode pixels. Since no signal voltage is applied to the reflective electrode for these pixels, the liquid crystal material in front of the given pixel is not turbulent and does not scatter incoming light. The reflected rays such as 27a, 27b, or 27c are then transmitted through the aperture stop 26 by virtue of the geometric optics design of the system for projection to the screen 30 through projection lens 28. The dark parts of the image are created by pixels for which the reflective electrode is energized so that the liquid crystal material in front of that point is in the scattering mode. Rays which would be reflected in the manner shown in FIG. 1 from such a point are scattered sufficiently so that less than 1% are transmitted through the aperture 26. Only this small portion of the light scattered from the energized or "on" pixels thus emerges through the projector system stop and on to the viewing screen and thus energized pixels appear dark. Display shades of gray are a function of the "on" magnitude of the pixel. The greater the turbulence for a higher voltage, the greater the scattering and the smaller the percentage of light which is transmitted through aperture 26.

The contrast that can be achieved is therefore a function of the specular reflection efficiency of the pixel electrode surface, the magnitude of the light energy that passes through the projector system stop when the display is in the scattering mode, and the combined undesirable reflections from the inner surface of liquid crystal display cover glass and the indium tin oxide electrode coating. It will be recalled that the first or outer surface reflection from the cover glass 11 of the liquid crystal cell has been eliminated by using the wedge 24 in front of that surface. To minimize reflection from the ITO electrode it is preferred to make the electrode approximately $\frac{1}{4}$ wavelengths of the incident light when the cover plate and the liquid crystal have substantially equal indices of refraction.

For the preferred embodiment described above, the liquid crystal display pixel electrode reflection is approximately 50% of the total light energy directed at that surface. The indium tin oxide (plus inner glass surface) reflection is approximately 1.0%. The scattered light passing through a stop whose diameter subtends 2 to the liquid crystal is estimated to be 0.85% of the liquid crystal specular level. The Contrast Ratio achievable from this baseline assumption is:

$$C.R. = \frac{\text{specular reflection coefficient of liquid crystal elemental electrode}}{\text{\% specular reflection from inner surface of coverglass and ITO coating} + \text{\% of diffuse scattering mode light passing through stop}}, \text{ or,}$$

$$C.R. = \frac{0.5 \, (LX)}{0.01 \, (ITO) + 0.0085} = 27$$

The liquid crystal image is projected to the front or back side of the viewing screen 30 (as may be appropriate in a given design) in the same manner that is employed by the usual film projector. The image is viewed from the appropriate side. The gain of the screen must be selected for the particular application. For instance: a high gain screen may be used as the image plane in an optical system where the ray angles are controlled and a low gain screen, approaching a lambertian surface, may be used in a system where the viewer looks directly at the image screen. The latter type of screen is not very sensitive to viewing angle. Where the viewing screen is intended to serve as an object surface for a relay lens or other optical system, the screen 30 may be a composite comprising a diffusing screen 31 and a fresnel lens 32. The gain of the diffusing screen can then be matched to the desired exit pupil size to accommodate the other optical system and the fresnel lens can appropriately aim the light to the other system. A similar function can be achieved by other equivalent optical arrangements. For example, a holographic optical element or diffraction lens can be used in place of the fresnel lens. More generally, however, it will be understood that viewing the screen 30 may be any suitable imaging surface.

The system described above has the advantage that the reflector configuration maximizes the amount of lamp energy that can be gathered and directed onto the liquid crystal. This results in a high efficiency lamp input power to screen brightness ratio. The optical "stop" is an integral part of the reflector shape. The reflector is an optical element in the optical system. The brightness of the display is limited primarily by the lamp output. The potential display brightness far exceeds the capability of a cathode ray tube used in a raster or stroke written symbol mode. The screen can be selected to meet intended wide or narrow field of view viewing applications. The display resolution is limited by the liquid crystal pixel density, screen size and projector magnification factor. The display potential contrast ratio or the number of shades of gray exceeds all known display requirements.

The liquid crystal image projector optical system may be folded by using mirrors in the projection path in a manner well known in the art. When so folded, it takes less space than equivalent conventional cathode ray tube displays.

What is claimed is:

1. In a liquid crystal image projector system of the type having as its optical elements liquid crystal display means for creating an image to be displayed, light source means for illuminating said liquid crystal display means, imaging surface means, and a projection lens means for focusing said liquid crystal display means image onto said imaging surface means, the improvement comprising:
   (a) aspheric reflector means having a concave surface for gathering and concentrating light from said light source onto the surface of said liquid crystal display means;
   (b) stop means formed by an optical aperture in said aspheric reflector means; and
   (c) means for positioning said elements of said image projector system for transmitting light from said light source to said concave surface of said aspheric reflector to be reflected by it through a first transparent surface of said liquid crystal display means onto a reflective electrode of said liquid crystal display means from which light forming said image is reflected through said stop means and thence through said projection lens means to form said image on said imaging surface means.

2. A liquid crystal image projector system as in claim 1 and further including: (a) electronically activated matrix drive signal means for activating said liquid crystal display means.

3. A liquid crystal image projector system as in claim 1 and further including:
   (a) filter means positioned between said light source means and said reflector means for reducing the ultraviolet and infrared radiation that is radiated into said projector optical system.

4. A liquid crystal image projector system as in claim 1 and further including:
   (a) said liquid crystal display means being of the dynamic scattering type operated in the specular mode.

5. A liquid crystal image projector system as in claim 1 and further including:
   (a) wedge shaped cover glass means positioned in front of said first surface of said liquid crystal display means for keeping the first surface reflection from said display means from being directed through said stop means in said reflector means in order to prevent degradation of the display contrast ratio, said reflector means shape being designed to compensate for the distortion due to said wedge shaped cover glass means.

6. A system as in either claim 1, claim 2, or claim 5 wherein said aspheric reflector means has the shape of a portion of the surface of an ellipsoid formed by rotating an ellipse about one of its axes.

7. A system as in claim 6 wherein said light source means is positioned with respect to said aspheric reflector as as to be located at a focal point of said ellipse.

8. A liquid crystal image projector system as in claim 1, claim 2 or claim 5 wherein said imaging surface means comprises diffusing screen means for matching a desired exit pupil size.

9. A system as in claim 8 and further including means for reaiming light transmitted through said diffusing screen means.

* * * * *